United States Patent
Willis et al.

(10) Patent No.: US 10,999,419 B1
(45) Date of Patent: May 4, 2021

(54) SYSTEMS AND METHODS FOR IN-VEHICLE VOICE CALLS

(71) Applicant: Harman International Industries, Incorporated, Stamford, CT (US)

(72) Inventors: Maxwell Willis, Royal Oak, MI (US); Christopher Michael Trestain, Livonia, MI (US); Chris Ludwig, Bloomfield Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/909,766

(22) Filed: Jun. 23, 2020

(51) Int. Cl.
| | |
|---|---|
| *H04W 4/48* | (2018.01) |
| *H04M 3/42* | (2006.01) |
| *H04M 1/60* | (2006.01) |
| *H04W 4/44* | (2018.01) |
| *G06F 16/68* | (2019.01) |
| *H04M 7/06* | (2006.01) |

(52) U.S. Cl.
CPC .......... *H04M 1/6091* (2013.01); *G06F 16/68* (2019.01); *H04M 3/42357* (2013.01); *H04M 7/06* (2013.01); *H04W 4/44* (2018.02)

(58) Field of Classification Search
CPC .. H04M 1/247; H04M 1/2477; H04M 1/6033; H04M 1/6083; H04M 1/6091; H04M 3/42; H04M 3/42357; H04W 4/30; H04W 4/44; H04W 4/48; H04W 4/40; G06F 16/60; G06F 16/68
See application file for complete search history.

(56) References Cited

U.S. PATENT DOCUMENTS

| | | | |
|---|---|---|---|
| 10,291,996 B1 * | 5/2019 | Shaffer | G10L 15/22 |
| 2013/0150004 A1 * | 6/2013 | Rosen | H04W 48/04 455/414.1 |
| 2015/0120305 A1 * | 4/2015 | Buck | H04M 3/568 704/275 |
| 2015/0256668 A1 * | 9/2015 | Atkinson | H04B 17/318 455/418 |
| 2017/0323639 A1 * | 11/2017 | Tzirkel-Hancock | H04M 1/6075 |

* cited by examiner

Primary Examiner — Blane J Jackson
(74) *Attorney, Agent, or Firm* — McCoy Russell LLP

(57) ABSTRACT

Embodiments are disclosed for providing voice calls to users of a motor vehicle. As an example, a method comprises: responsive to a voice call, routing the voice call to at least one phone zone of a plurality of phone zones based on at least one of a user input and a source of the voice call, the plurality of phone zones included in a cabin of a motor vehicle. In this way, sonic interference with a voice call may be reduced, while a main system audio may continue to play for unselected phone zones.

17 Claims, 5 Drawing Sheets

SYSTEMS AND METHODS FOR IN-VEHICLE VOICE CALLS

FIELD

The disclosure relates to the field of in-vehicle speaker systems.

BACKGROUND & SUMMARY

Many vehicles include an in-vehicle infotainment system for providing media to users, such as music, navigational assistance, talk radio, virtual personal assistants, and the like. Further, an in-vehicle infotainment system may enable users to receive and place voice calls (e.g., such as telephone calls) in a hands-free fashion, which may increase satisfaction. For example, incoming audio from a voice call may be broadcast via speakers of the vehicle, and outgoing audio for the voice call may be captured by microphones of the vehicle. However, by relying on speakers and microphones of the vehicle, sound quality may be reduced relative to using a headset. Further, when more than one user is in the vehicle, the voice call may be intended for only one user, who may desire privacy while conducting the voice call. Noise from other users may degrade audio quality during the voice call. Further still, the in-vehicle infotainment system may not allow multiple users to place and receive voice calls at the same time, which may decrease user satisfaction. As such, systems and methods for allowing individual users to place and receive voice calls without degrading audio quality or reducing user privacy are desired.

The inventors have recognized the previously mentioned issues and have developed systems and methods to at least partially address the above issues. For example, a method comprises: responsive to a voice call, routing the voice call to at least one phone zone of a plurality of phone zones based on at least one of a user input and a source of the voice call, the plurality of phone zones included in a cabin of a motor vehicle.

As an example, a motor vehicle may receive a voice call via a variety of sources. For example, a mobile phone may be communicatively coupled to an in-vehicle computing system of the motor vehicle, and a phone call received by the mobile phone may be routed to the motor vehicle. As another example, the in-vehicle computing system may directly receive a voice call via a wireless network. In order to provide the voice call to a desired user, the in-vehicle computing system may select at least one phone zone of the motor vehicle. For example, a vehicle cabin of the motor vehicle may comprise a plurality of phone zones, each phone zone including at least one microphone and at least one speaker, so that each user of the vehicle may be provided with a personalized media experience, such as a personalized voice call experience. Therefore, the in-vehicle computing system may route the voice call to the at least one phone zone selected. As an example, incoming voice call audio may be broadcast over speakers of the at least one phone zone, and outgoing voice call audio may be captured via microphones of the at least one phone zone. During the voice call, incoming voice call audio may not be provided to the other phone zones (e.g., the unselected phone zones), and outgoing voice call audio may not be captured by microphones of the other phone zones. Further, a main system audio may be compressed, and the main system audio gain may be reduced.

In this way, a first user of a vehicle may be provided with a voice call, while other users of the vehicle may continue to enjoy a main system audio stream, such as music. Further, by providing the voice call only to a subset of phone zones, voice call privacy may be increased, so that the first user may converse more freely. For example, increasing voice call privacy may increase user satisfaction. Further, by continuing to provide the main system audio to the unselected phone zones, a media experience of the other users of the vehicle may not be interrupted, which may increase user enjoyment of the vehicle. By applying signal processing to the incoming and outgoing voice call audio, and by adjusting the main system audio, sonic interference with the voice call may be reduced, thus increasing audio quality for the voice call. Thus, a subset of passengers in a vehicle may engage with a voice call privately, while other passengers may continue to listen to other media, such as music. Further, by applying signal processing techniques, and by differentially adjusting each microphone and speaker to reduce sonic interference, voice call audio quality may be increased. Overall, customer satisfaction may be increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
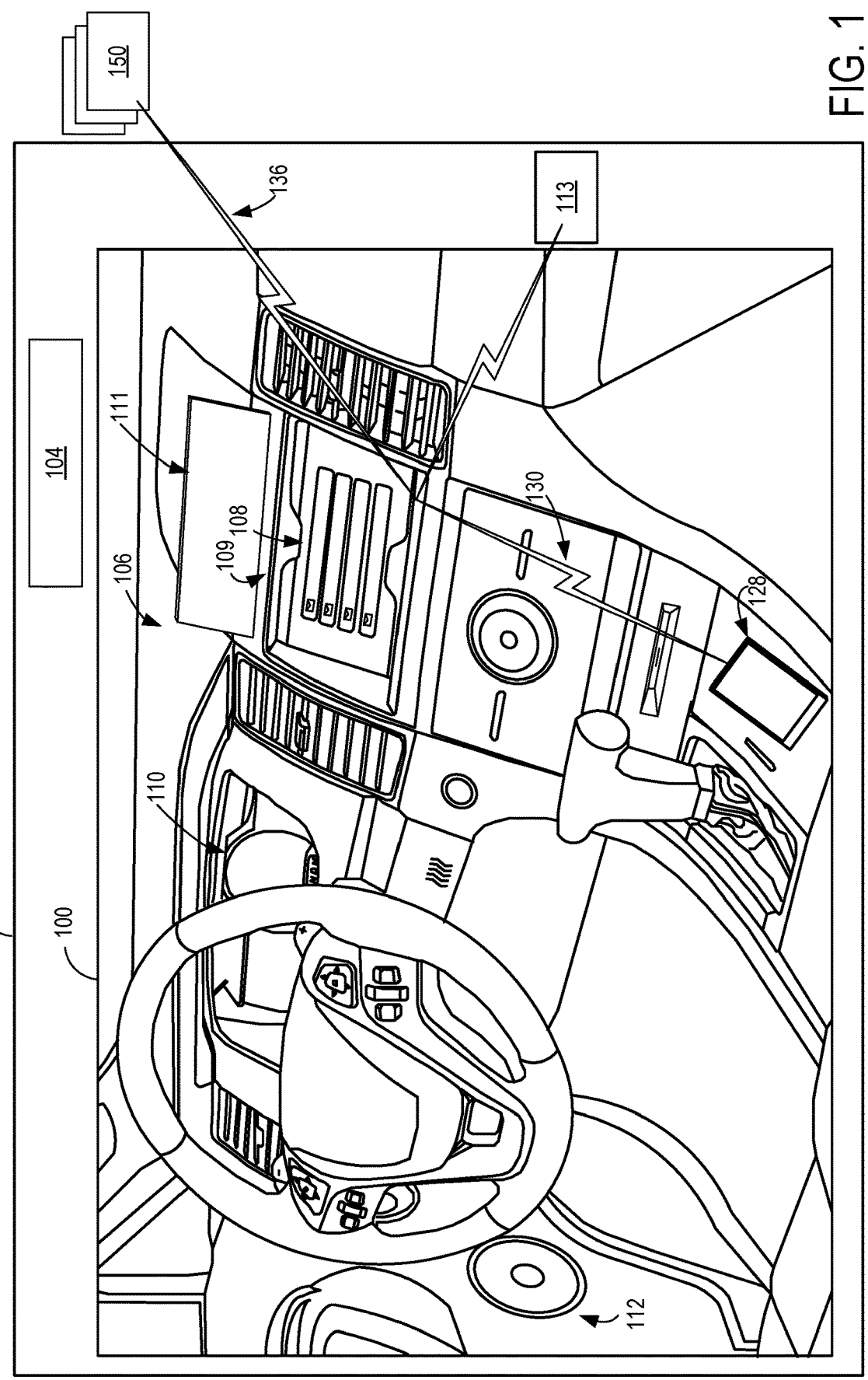
FIG. 1 shows an example partial view of a vehicle cabin in accordance with one or more embodiments of the present disclosure.
Figure 2:
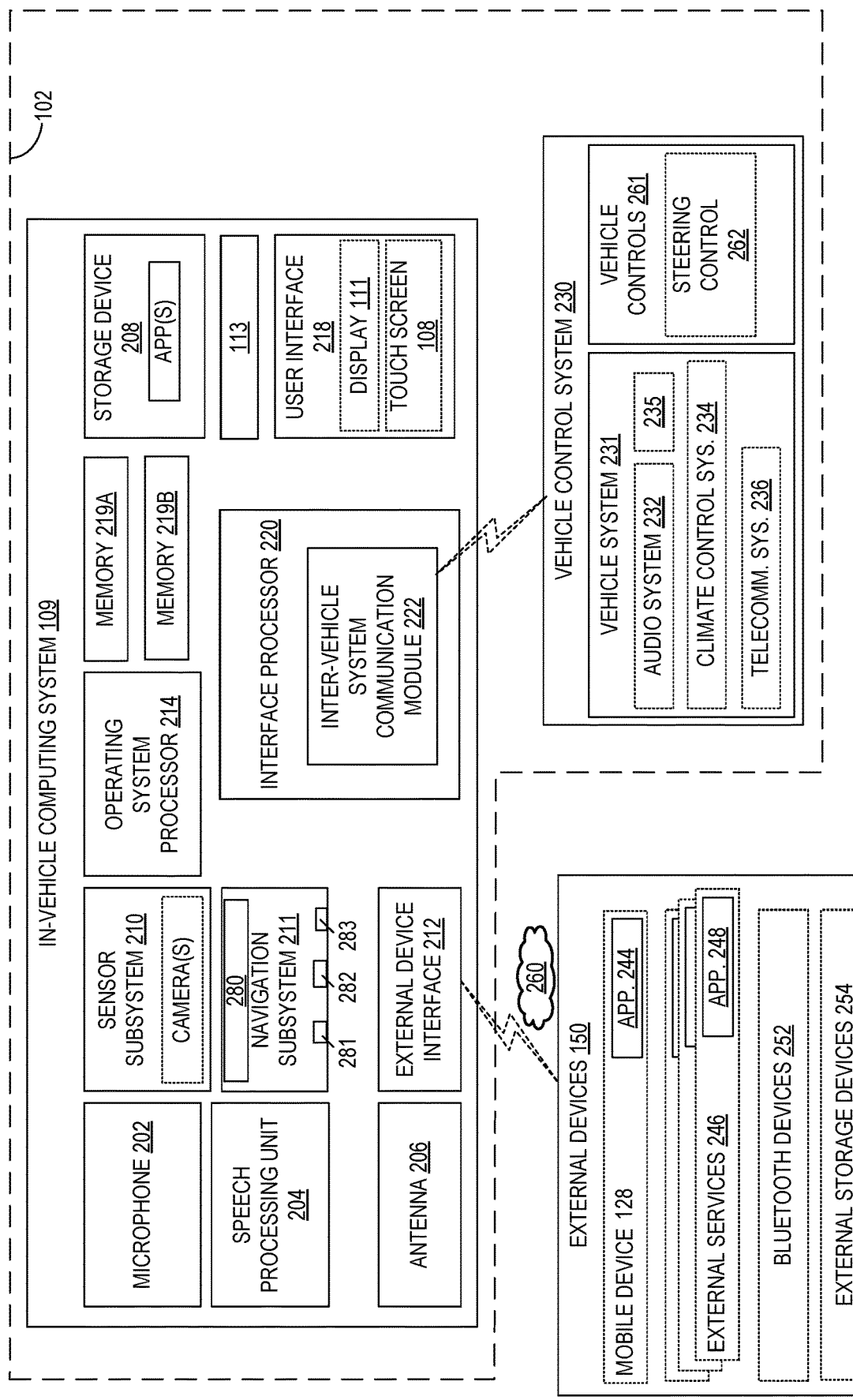
FIG. 2 shows a block diagram of an example in-vehicle computing system of a vehicle, in accordance with one or more embodiments of the present disclosure.
Figure 3:
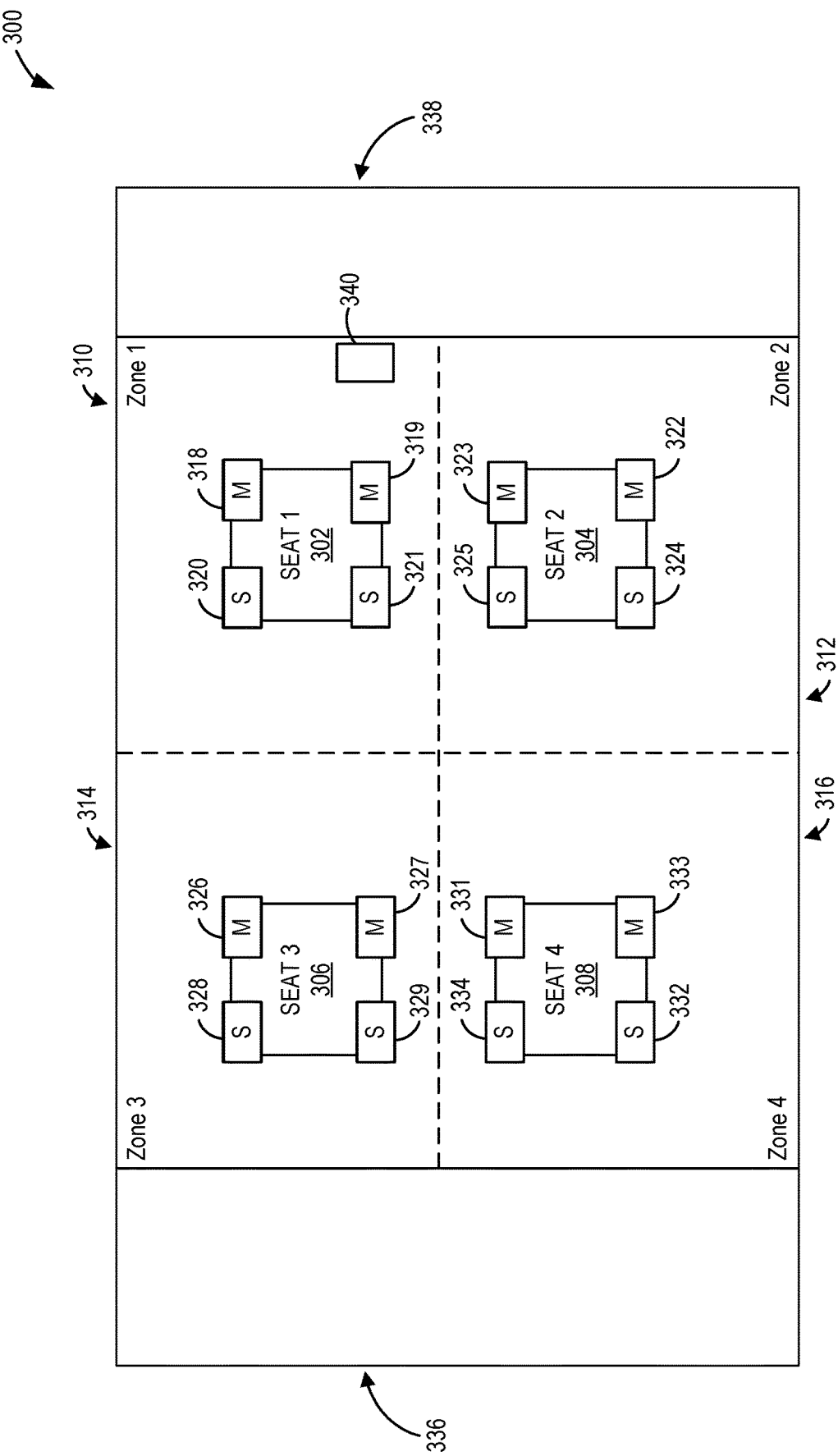
FIG. 3 shows a schematic view of the example vehicle cabin including a plurality of phone zones comprising a plurality of speakers and microphones.
Figure 4:
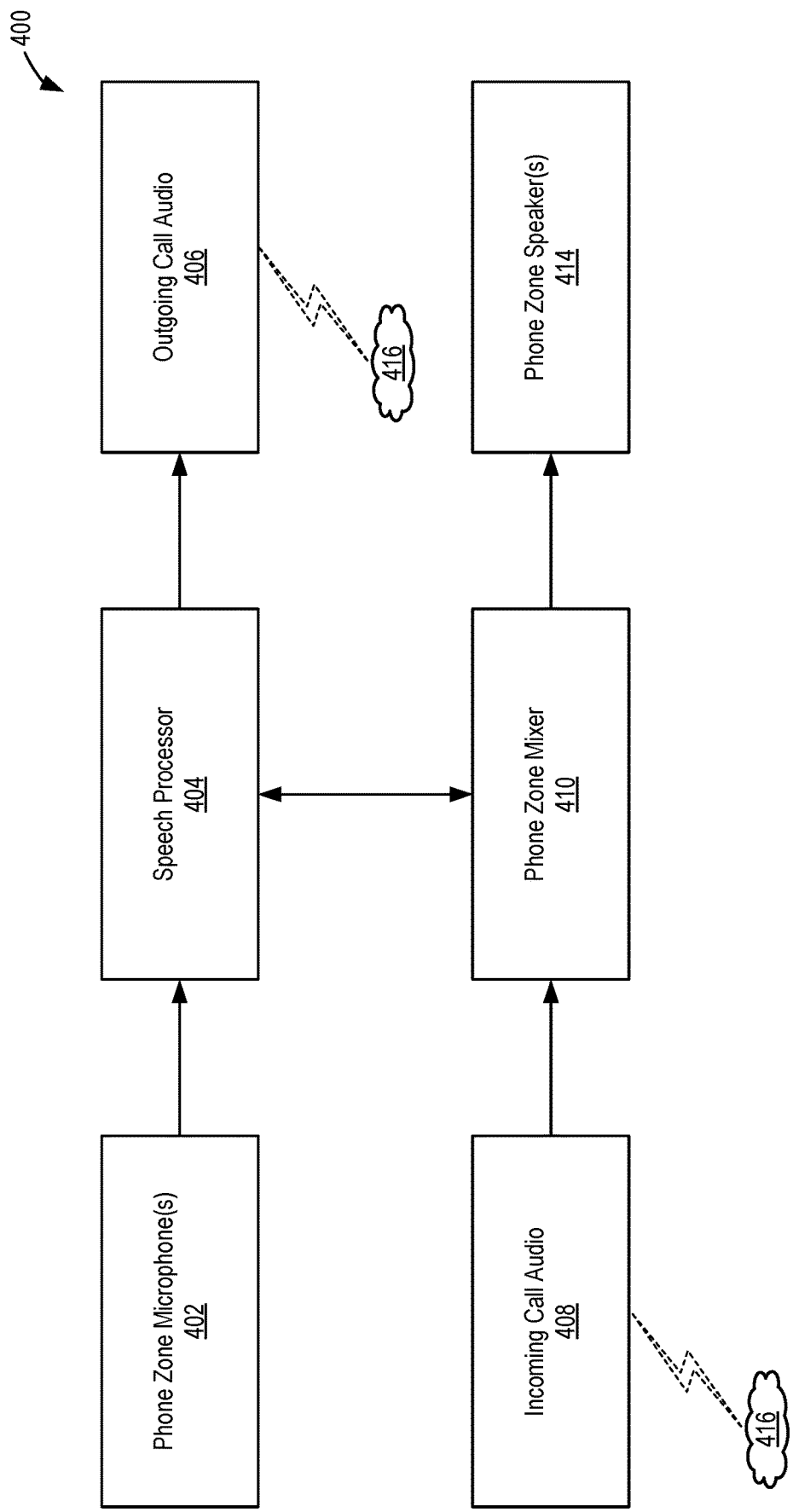
FIG. 4 shows a schematic view of signal processing for voice calls, in accordance with one or more embodiments of the present disclosure.
Figure 5:
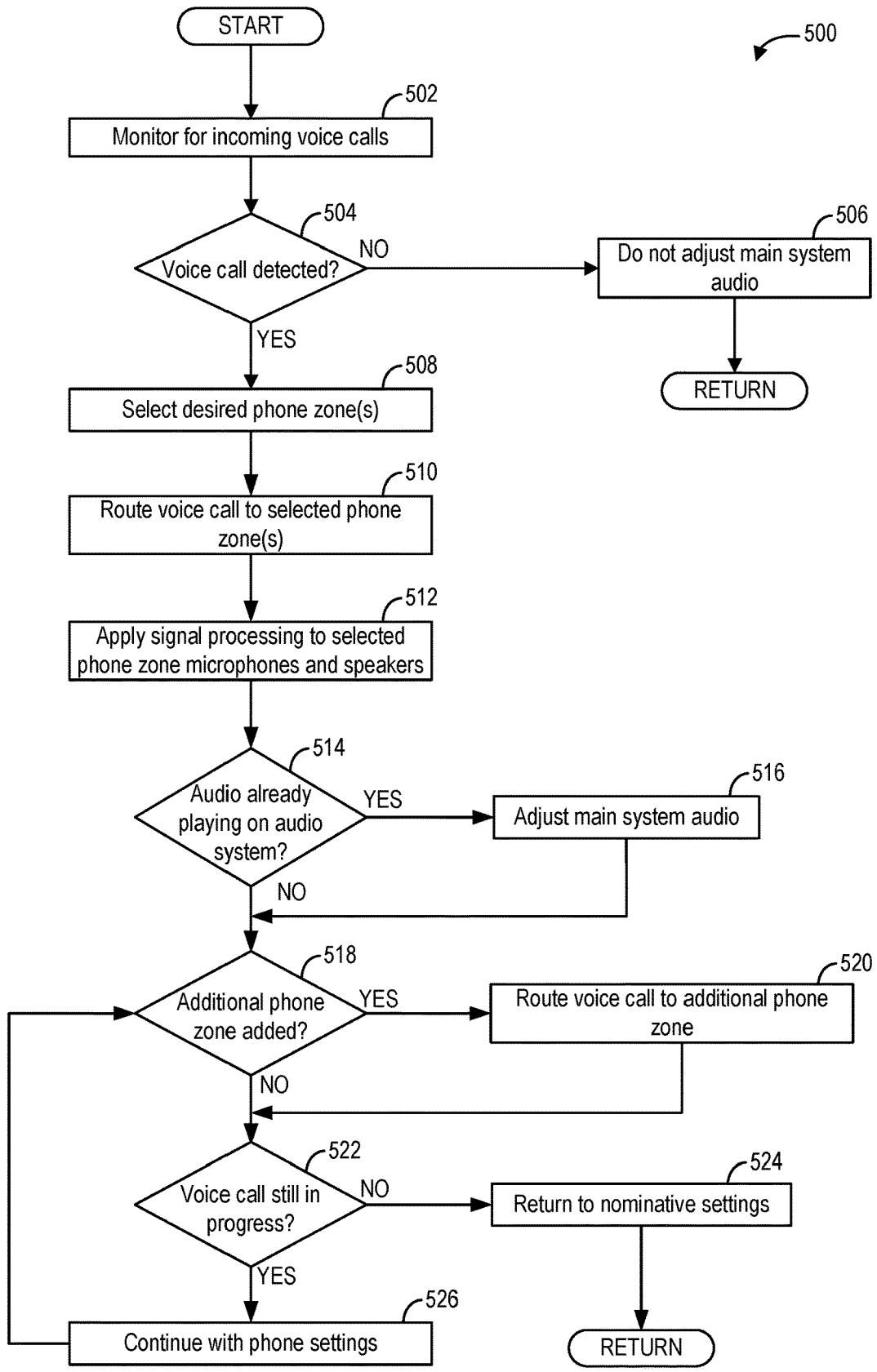
FIG. 5 shows a high-level flow chart illustrating an example method for adjusting an audio system of a motor vehicle in order to facilitate a voice call.

As described above, an in-vehicle entertainment system may route a voice call to one or more of a plurality of distinct phone zones of a vehicle, and may adjust an audio system of a vehicle in order to reduce sonic interference. For example, the vehicle may include a computing system and a plurality of phone zones, each phone zone including dedicated speakers and microphones. In some examples, the computing system and audio system may be included in a vehicle system, such as depicted in FIGS. 1 and 2, so that multiple vehicle passengers may receive voice calls and interact with media via the audio system. Further, the phone zones may be positioned in a vehicle cabin, as shown in FIG. 3. Incoming voice call audio and outgoing voice call audio may be processed according to the signal flow shown in FIG. 4. Further, as shown in the method of FIG. 5, the computing system of the vehicle may direct a voice call to a selected phone zone, while adjusting media already playing (e.g., such as music) so that a user experience is not interrupted, and sonic interference with the voice call is not increased. In this way, a voice call may be provided to a selected phone zone.

FIG. 1 shows an example partial view of one type of environment for an audio customization system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a human driver (also referred to as the user) of vehicle 102. For example, instrument panel 106 may include a user input device such as a touch screen 108 of an in-vehicle computing system 109 (e.g., an infotainment system), an audio system control panel, and an instrument cluster 110. Touch screen 108 may receive user input to the in-vehicle computing system 109 for controlling audio output, visual display output, user preferences, control parameter selection, etc. Further, additional user interfaces, not shown, may be present in other portions of the vehicle, such as proximate to at least one passenger seat. For example, the vehicle may include a row of back seats with at least one touch screen controlling the in-vehicle computing system 109. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In addition, the in-vehicle computing system 109 may adjust audio output volume or power output level, which speakers are activated, and signals for generating sounds at speakers in response to output from sound processor for external sounds 113.

In some embodiments, one or more hardware elements of in-vehicle computing system 109, such as touch screen 108, a display screen 111, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system 109 may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct voice calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct, Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, sound processor for external sounds 113, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

FIG. 2 shows a block diagram of an in-vehicle computing system 109 configured and/or integrated inside vehicle 102. In-vehicle computing system 109 may perform one or more of the methods described herein in some embodiments. In some examples, the in-vehicle computing system 109 may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, subsystems, hardware components, as well as software applications and systems that are integrated in, or integratable into, vehicle 102 in order to enhance an in-vehicle experience for a driver and/or a passenger.

In-vehicle computing system 109 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine Controller Area Network [CAN] bus through which engine related information may be communicated, a climate control CAN bus through which climate control related information may be communicated, and a multimedia data network through which multimedia data is communicated between multimedia components in the vehicle). For example, the in-vehicle computing system 109 may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 109 to store data such as instructions executable by processors 214 and 220 in non-volatile form. The storage device 208 may store application data, including prerecorded sounds, to enable the in-vehicle computing system 109 to run an application for connecting to a cloud-based server and/or collecting information for transmission to the cloud-based server. The application may retrieve information gathered by vehicle systems/sensors, input devices (e.g., user interface 218), data stored in volatile 219A or non-volatile storage device (e.g., memory) 219B, devices in communication with the in-vehicle computing system (e.g., a mobile device connected via a Bluetooth link), etc. In-vehicle computing system 109 may further include a volatile memory 219A. Volatile memory 219A may be random access memory (RAM). Non-transitory storage devices, such as non-volatile storage device 208 and/or non-volatile memory 219B, may store instructions and/or code that, when executed by a processor (e.g., operating system processor 214 and/or interface processor 220), controls the in-vehicle computing system 109 to perform one or more of the actions described in the disclosure.

A plurality of microphones 202 may be included in the in-vehicle computing system 109 to receive voice commands from a user, to measure ambient noise in the vehicle, to determine whether audio from speakers of the vehicle is tuned in accordance with an acoustic environment of the vehicle, etc. Further, the plurality of microphones 202 may be used to make voice calls. A speech processing unit 204 may process voice commands, such as the voice commands received from the plurality of microphones 202. In some embodiments, in-vehicle computing system 109 may also be able to receive voice commands and sample ambient vehicle noise using a microphone included in an audio system 232 of the vehicle.

One or more additional sensors may be included in a sensor subsystem 210 of the in-vehicle computing system 109. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 109 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230.

A navigation subsystem 211 of in-vehicle computing system 109 may generate and/or receive navigation information such as location information (e.g., via a GPS sensor and/or other sensors from sensor subsystem 210), route guidance, traffic information, point-of-interest (POI) identification, and/or provide other navigational services for the driver. Navigation sub-system 211 may include inputs/outputs 280, including analog to digital converters, digital inputs, digital outputs, network outputs, radio frequency transmitting devices, etc.

External device interface 212 of in-vehicle computing system 109 may be coupleable to and/or communicate with one or more external devices 150 located external to vehicle 102. While the external devices are illustrated as being located external to vehicle 102, it is to be understood that they may be temporarily housed in vehicle 102, such as when the user is operating the external devices while operating vehicle 102. In other words, the external devices 150 are not integral to vehicle 102. The external devices 150 may include a mobile device 128 (e.g., connected via a Bluetooth, NFC, WIFI direct, or other wireless connection) or an alternate Bluetooth-enabled device 252. Mobile device 128 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 150 may communicate with in-vehicle computing system 109 either wirelessly or via connectors without departing from the scope of this disclosure. For example, external devices 150 may communicate with in-vehicle computing system 109 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable voice calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct.

One or more applications 244 may be operable on mobile device 128. As an example, mobile device application 244 may be operated to aggregate user data regarding interactions of the user with the mobile device. For example, mobile device application 244 may aggregate data regarding music playlists listened to by the user on the mobile device, voice call logs (including a frequency and duration of voice calls accepted by the user), positional information including locations frequented by the user and an amount of time spent at each location, etc. The collected data may be transferred by application 244 to external device interface 212 over network 260. In addition, specific user data requests may be received at mobile device 128 from in-vehicle computing system 109 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, amplifier etc.) or other applications (e.g., navigational applications) of mobile device 128 to enable the requested data to be collected on the mobile device or requested adjustment made to the components. Mobile device application 244 may then relay the collected information back to in-vehicle computing system 109.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers 235. Vehicle audio system 232 may be passive or active such as by including a power amplifier. In some examples, in-vehicle computing system 109 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 102. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers 235 of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 109, such as via communication module 222. The control elements of the vehicle control system may be physically and permanently positioned on and/or in the vehicle for receiving user input. In addition to receiving control instructions from in-vehicle computing system 109, vehicle control system 230 may also receive input from one or more external devices 150 operated by the user, such as from mobile device 128. This allows aspects of vehicle systems 231 and vehicle controls 261 to be controlled based on user input received from the external devices 150.

In-vehicle computing system 109 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via antenna(s) 206 or via infrared or other means through appropriate receiving devices. In some embodiments, antenna 206 may be included as part of audio system 232 or telecommunication system 236. For example, antenna 206 may receive voice calls (e.g., such as telephone calls). Additionally, antenna 206 may provide AM/FM radio signals to external devices 150 (such as to mobile device 128) via external device interface 212.

One or more elements of the in-vehicle computing system 109 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 109 and mobile device 128 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

As elaborated above, a computing system may be included in a vehicle system, such as in-vehicle computing system 200 in vehicle 102 of FIG. 1. Further, as described above, in-vehicle computing system 200 may be used to route voice calls, such as voice calls from a cellular network, to users via speakers and microphones of the vehicle system. Specifically, incoming call audio may be broadcast over vehicle speakers, and outgoing call audio may be captured by vehicle microphones. Incoming voice calls may be detected by the in-vehicle computing system from several sources. As one example, a voice call may be received by a mobile device (e.g., mobile device 128 of FIGS. 1 and 2), the mobile device communicatively coupled to the in-vehicle computing system via a wireless and/or a wired connection. For example, the mobile device may be paired to the in-vehicle computing system via a Bluetooth connection. As such, speakers and microphones of the vehicle system may be used during the voice call in order to allow hands-free calls during vehicle operation. As another example, the in-vehicle computing system may directly receive a voice call via a mobile communications network. As yet another example, the in-vehicle computing system may receive a voice call, such as a Voice over Internet Protocol (VoIP) call, over a wireless network, such as a Wi-Fi network, an Ultra-Wide Broadband (UWB) network, and the like. Further, a user may place (e.g., initiate) a voice call via controls of the in-vehicle computing system. As an example, a user may input a command via a touch screen (e.g., touch screen 108 of FIGS. 1 and 2) in order to initiate a voice call. As another example, a user may give a voice command in order to initiate a voice call. When a voice call is detected, incoming telephone audio may be reproduced via one or more speakers of audio system 232, and outgoing telephone audio may be captured via one or more microphones of audio system 232.

Although more than one passenger may be present in the vehicle, a voice call may be intended for only a subset of passengers present in a vehicle. For example, four passengers may be in a vehicle when an incoming voice call is detected, but the voice call may be directed to one passenger in the vehicle. As another example, three passengers may be in the vehicle when a voice call is initiated, but the voice call may be intended only for two passengers in the vehicle. In such examples, in-vehicle voice calls may disrupt other media being reproduced by audio system 232. For example, a music stream may be paused or muted during a voice call, which may decrease enjoyment and satisfaction of vehicle passengers not included in the voice call. Further, in existing vehicle systems, all passengers of a vehicle may hear the voice call, which may decrease privacy for the user directly engaging in the voice call. Further still, speech from other users may degrade audio quality in the voice call. The issues described above may be addressed by providing the vehicle with a plurality of phone zones, which may provide a degree of audio isolation for each user during voice calls. As an example, the vehicle system may comprise a plurality of phone zones for providing voice calls to the plurality of users, in order to reduce sonic interference between each user of the plurality of users. For example, each phone zone may include at least one speaker and at least one microphone, and signal processing techniques may be used to reduce sonic interference between phone zones. Thus, voice call audio may be routed to at least one selected phone zone, while passengers in unselected phone zones may continue to listen to other audio. In this way, the benefits of hands-free in-vehicle voice calls may be provided, without decreasing user privacy or degrading audio quality of the voice call.

Therefore, FIG. 3 shows a block diagram of a vehicle 300, which may be vehicle 102 shown in FIG. 1, including a plurality of phone zones and an in-vehicle computing system 340. For example, in-vehicle computing system 109 of FIG. 2 may be used as in-vehicle computing system 340. In the example shown in FIG. 3, a vehicle 300 includes a first phone zone 310, a second phone zone 312, a third phone zone 314, and a fourth phone zone 316. Vehicle 300 further includes a front side 338 and a back side 336. The vehicle 300 may be an automobile, truck, boat, or the like. Further, although a vehicle with four seats is shown, other configurations including more or fewer seats may be used.

Further, each of the first phone zone 310, the second phone zone 312, the third phone zone 314, and the fourth phone zone 316 may include at least two microphones and at least two speakers. As shown, the first phone zone 310 includes a first microphone 318, a second microphone 319, a first speaker 320, and a second speaker 321. Further, the second phone zone 312 includes a third microphone 323, a fourth microphone 322, a third speaker 325, and a fourth speaker 324. Further still, the third phone zone 314 includes a fifth microphone 326, a sixth microphone 327, a fifth speaker 328, and a sixth speaker 329. Even further, the fourth phone zone 316 includes a seventh microphone 331, an eighth microphone 333, a seventh speaker 334, and an eighth speaker 332. Further, a first seat 302 of vehicle 300 may be positioned in the first phone zone 310, a second seat 304 may be positioned in the second phone zone 312, a third seat 306 may be positioned in the third phone zone 314, and a fourth seat 308 may be positioned in the fourth phone zone 316. Specifically, each phone zone includes two microphones positioned to capture user audio and two speakers positioned to provide sound to the user. For example, the microphones may be positioned to capture user audio from a user positioned in the phone zone without significant interference from users positioned in other phone zones. Further, the speakers may be positioned to provide audio (e.g., from an in-vehicle computing system, such as media) without interrupting audio in another phone zone. As an example, the two speakers of each phone zone may be coupled to the seat of the phone zone. For example, the first speaker 320 and the second speaker 321 may be fixedly coupled to first seat 302 of the first phone zone 310. Specifically, each of the first speaker 320 and the second speaker 321 may be positioned to be near a head of a user when the user is seated in the first seat 302, such as to a headrest of first seat 302. As another example, the first microphone 318 and the second microphone 319 may be configured with beamforming, which may reduce sonic interference from other users' speech and media. Although FIG. 3 shows each phone zone including two microphones and two speakers, in some examples, each phone zone may include more or fewer microphones and more or fewer speakers. For example, a plurality of speakers may be arranged in each phone zone to increase audio quality, and a plurality of microphones may be arranged to decrease audio interference during microphone use.

In some examples, at least one user may be positioned in a seat of each phone zone. For example, a first user may be positioned in the first seat 302 of the first phone zone 310, a second user may be positioned in the second seat 304 of the second phone zone 312, a third user may be positioned in the third seat 306 of the third phone zone 314, and a fourth user may be positioned in the fourth seat 308 of the fourth phone zone 316. However, in other examples, a user may not be positioned in each phone zone. As an example, the first user may be positioned in the first seat 302 of the first phone zone 310 and the third user may be positioned in the third seat 306 of the third phone zone 314, but no users may be positioned in each of the second seat 304 and the fourth seat 308. In other examples, only a single user may be present in the vehicle. In still other examples, more than one user may be positioned in each phone zone.

Thus, vehicle 300, shown in FIG. 3, includes a computing system and four phone zones, with each phone zone including at least two microphones and at least two speakers. Each speaker and each microphone may be communicatively coupled to the computing system. Further, each phone zone may be provided with audio independently. In particular, each phone zone may be independently provided with voice call audio (e.g., incoming audio from a voice call). For example, incoming audio from a voice call may be provided to a selected phone zone via the at least two speakers of the phone zone, and outgoing audio for a voice call may be captured from the selected phone zone via the microphones of the phone zone. Further, the operation of each of the speakers and each of the microphones may be adjusted based on vehicle operating conditions in order to adjust for vehicle noise. For example, based on vehicle speed, vehicle acceleration, and sensed ambient noise, a speaker volume may be adjusted for each speaker of the vehicle. Further, each speaker may be adjusted differentially, based on an ambient noise in each phone zone and an audio signal to other phone zones. For example, based on a volume and type of media being played by the fifth speaker 328 and the sixth speaker 329 of third phone zone 314, each of the seventh speaker 334 and the eighth speaker 332 may be differentially adjusted to reduce interference and increase customer satisfaction. For example, each speaker of a phone zone may be adjusted differently based on a location relative to other speakers of the vehicle. For example, speaker and microphone operation in each phone zone may be adjusted during voice calls, as will be elaborated below.

Further, in some examples, two or more phone zones may be combined into a single phone zone in response to a user input. For example, a user may input a request to combine two adjacent phone zones so that the user may interact with additional speakers and microphones. As another example, the user may input a request to combine two phone zones so that multiple users may participate in a voice call.

Note that the phone zone configuration shown in FIG. 3 is a non-limiting example of a phone zone configuration. In other embodiments of the present disclosure, a vehicle may have more or fewer phone zones, and the phone zones may be arranged differently. As an example, a vehicle may have two phone zones, three phone zones, five phone zones, and so on. As another example, a number of speakers and a number of microphones in each phone zone may vary. As an example, a first phone zone may have three speakers and three microphones, while a second phone zone may have one speaker and two microphones. As another example, a phone zone may include a single microphone equipped with beamforming in order to capture telephone audio without significant interference.

For example, an in-vehicle computing system (e.g., such as in-vehicle computing system 109) may directly route a voice call to at least one selected phone zone, so that incoming call audio (e.g., incoming audio from the voice call) is reproduced only via speakers of the at least one selected phone zone, and outgoing call audio (e.g., outgoing audio for the voice call) is captured only via microphones of the at least one selected phone zone. As such, the voice call is not routed to other phone zones of the vehicle (e.g., unselected phone zones), so that incoming call audio is not reproduced via speakers of the unselected phone zones, and outgoing call audio is not captured by microphones of the unselected phone zones. For example, a user may select at least one phone zones for the voice call via a user input device, such as a touch screen (e.g., such as the touch screen of user interface 218 of FIG. 2). By routing the voice call to the at least one selected phone zone and not routing the voice call to the unselected phone zones, other media may continue to play in the unselected phone zones. As an example, the main system audio (e.g., such as music) may be provided to the unselected phone zones while the voice call is routed to the at least one selected phone zone.

In order to avoid sonic interference between phone zones, signal processing may be applied. For example, during the voice call, the main system audio may be ducked (e.g., a volume of the main system audio may be reduced in proportion to a volume of the voice call) and the main system audio signal may be compressed in order to decrease transients. Further still, specific processing techniques may be applied to microphones of the at least one selected phone zone, such as an echo canceller and a beam former in order to capture only audio from the selected phone zones, while cancelling audio interference from other regions of the vehicle. For example, microphones in the unselected phone zones may be muted, and audio may not be captured from the microphones in the unselected phone zones. Because the frequency range for voice calls is limited to a set range, additional filtering may not be required in order to reduce sonic interference. As another example, microphones in the unselected phone zones may not be muted, and audio from microphones in the unselected phone zones may be captured to be used as a cancellation signal. For example, the cancellation signal may be used to cancel audio from unselected phone zones that may be inadvertently picked up by microphones in the selected phone zones via propagation inside the car. Specifically, the cancellation signal can be used in signal processing for the outgoing audio.

As a first non-limiting example, a first voice call may be detected by the in-vehicle computing system 340 of vehicle 300 of FIG. 3, while the main system audio plays music. In particular, the first voice call may be an incoming voice call directed to a mobile phone coupled to the in-vehicle computing system via a Bluetooth connection, and the in-vehicle computing system may prompt a user to select a phone zone for the voice call. The user may select the second phone zone, so that the first voice call is routed to the second phone zone 312. For example, the user may select the second phone zone 312 via one of a touch screen input and a voice command. Thus, incoming audio from the first voice call may be reproduced via the third speaker 325 and the fourth speaker 324 of the second phone zone 312, and outgoing audio for the first voice call may be captured by the third microphone 323 and the fourth microphone 322 of the second phone zone 312. During the first voice call, signal processing may reduce sonic interference with the outgoing call audio from other regions of the vehicle. For example, techniques such as beamforming and echo canceling may be applied to outgoing call audio captured by the third microphone 323 and the fourth microphone 322. Audio may not be captured by other microphones of the vehicle. Further, although the main system audio (e.g., music) continues to play via speakers of the unselected phone zones (e.g., the first phone zone 310, the third phone zone 314, and the fourth phone zone 316), the audio gain for the main system audio is reduced (e.g., ducked), and the main system audio is compressed. In some examples, the main system audio is ducked differently for each speaker of the unselected phone zones based on speaker proximity to the second phone zone 312. For example, the audio gain may be reduced more for the second speaker 321 than for the fifth speaker 328. In this way, the user of the second phone zone 312 may engage in a voice call without interrupting the main system audio for other users of the vehicle, and without sonic interference from the main system audio and/or from other users of the vehicle.

As a second non-limiting example, a user may initiate a second voice call via the touch screen interface of the in-vehicle computing system, such as a VoIP voice call. Further, the user may select the first phone zone 310 and the third phone zone 314 for the voice call. Therefore, the in-vehicle computing system 340 routes the second voice call to the first phone zone 310 and the third phone zone 314. For example, incoming call audio from the second voice call is reproduced via the first speaker 320, the second speaker 321, the fifth speaker 328, and the sixth speaker 329. Further, outgoing call audio is captured via the first microphone 318, the second microphone 319, the fifth microphone 326, and the sixth microphone 327. Similar to the first voice call, signal processing techniques may be applied to reduce sonic interference with the second voice call. In some examples, the main system audio may be ducked differently during the second voice call relative to during the second voice call due to the relative positioning of the phone zones. For example, the main system audio may be ducked more in phone zones closer to the first phone zone and the second phone zone, and may be adjusted differentially for each speaker in each phone zone. Adjusting each speaker differently may decrease sonic interference while maintaining audio quality for each user.

Further, the first voice call and the second voice call may overlap, so that at least a portion of each of first voice call and the second voice call occur substantially simultaneously. For example, during an overlap between the first voice call and the second voice call, the first voice call may be routed to the second phone zone 312, the second voice call may be routed to the first phone zone 310 and the third phone zone 314, and the main system audio (e.g., music) may continue to play in the fourth phone zone 316. For example, the main system audio may be ducked differently in order to reduce interference between the main system audio and each of the first voice call and the second voice call.

As yet another example, during a voice call, an additional phone zone may be added to the voice call. As an example, a user may determine to add an additional user (e.g., a user in an unselected phone zone) to the voice call, and may input a command via at least one of a touch screen input and a voice command to add the additional phone zone to the voice call. For example, in response to such as command, the in-vehicle computing system may route the voice call to the additional phone zone.

In order to better describe the signal processing and signal routing described above, FIG. 4 shows a high-level block diagram 400 for providing main system audio and voice calls to phone zones in a vehicle. For example, FIG. 4 shows a signal processing for routing a phone call to a selected phone zone, including transmitting outgoing call audio and receiving incoming call audio. As shown, the selected phone zone includes phone zone microphones 402 for capturing audio from users during a voice call. As one example, the selected phone zone may be the second phone zone 312 of FIG. 4, and the phone zone microphones 402 may comprise third microphone 323 and fourth microphone 322. As shown, an audio signal from phone zone microphones 402 may be passed to a speech processor 404. For example, speech processor 404 may be a component of an in-vehicle computing system, such as in-vehicle computing system 109 of FIG. 2, and may be configured to process audio signal from the phone zone microphones 402 before outputting the call audio. In particular, signal processing may be applied in order to reduce sonic interference from other users and/or other media playing in the vehicle. As one example, echo cancelling may be applied to audio signals from the phone zone microphones 402. As another example, beamforming may be applied to audio signal from the phone zone microphones 402. As yet another example, equalization (EQ) may be used to reduce unwanted noise outside the frequency range of the human voice.

After the audio signal from the phone zone microphones 402 are processed via the speech processor 404, the audio signal may be output as outgoing call audio 406. For example, the outgoing call audio may be wirelessly transmitted via a wireless network 416. As one example, the outgoing call audio may be transmitted via a cellular network of a mobile device communicatively coupled to the in-vehicle computing system. As another example, a communication module of the vehicle (e.g., such as inter-vehicle system communication module 222) may transmit the outgoing call audio 406 to the desired recipient.

Further, as shown in FIG. 4, incoming call audio 408 received from the wireless network 416 may be passed to a phone zone mixer 410. For example, the phone zone mixer 410 may control speaker levels for each selected phone zone. Further, the phone zone mixer may include a seat tuner for adjusting speaker settings for each speaker in each phone zone selected for the voice call. For example, the phone zone mixer may route the voice call to the selected phone zone speakers, and may not route the voice call to phone zone speakers not selected. Further, the incoming call audio may be adjusted for each speaker of the selected phone zone based on relative positions of other speakers via the seat tuner. For example, speaker volume may be increased or decreased in order to reduce sonic interference with other users. Next, the incoming call audio is passed to the phone zone speakers 414 with the determined settings, and provided to the user. For example, the incoming call audio may be reproduced via the speakers of the at least one selected phone zone, and not reproduced via the speakers of the unselected phone zones. In some examples, the speech processor 404 and the phone zone mixer 410 may be communicatively coupled in order to synchronize incoming call audio and outgoing call audio, and in order to reduce any echo effects from either of the incoming call audio and the outgoing call audio.

In some examples, a plurality of voice calls may be routed to phone zone(s). As a non-limiting example, a first voice call may be routed to the first phone zone 310 of FIG. 3, and a second voice call may be routed to the fourth phone zone 316.

Next, a high-level flowchart of an example method 500 for adjusting audio to a plurality of phone zones during a voice call is shown in FIG. 5. In particular, method 500 is described with respect to the in-vehicle entertainment system of FIGS. 1 and 2, including in-vehicle computing system 200. However, in other examples, method 500 may be carried out by other computing systems. Further, method 500 is described with respect to the phone zones of the vehicle system of FIG. 3 and the signal processing techniques of FIG. 4. Instructions for carrying out method 500 may be stored in non-transitory memory of the in-vehicle computing system (e.g., storage device 208 shown in FIG. 2). As such, method 500 may be executed by a processor (e.g., operating system processor 214 of FIG. 2) based on the stored instructions and in conjunction with signals received from sensors of the vehicle system such as the sensors described hereinabove with reference to FIGS. 2 and 3.

At step 502, method 500 includes monitoring for incoming voice calls. For example, method 500 may monitor for an incoming voice call from a plurality of sources. As one example, the incoming voice call may originate from a user mobile device, such as a mobile phone, and may be routed to the in-vehicle computing system. Note that in some examples, more than one mobile phone may be communicatively coupled to the in-vehicle computing system. As another example, the in-vehicle computing system may directly receive a voice call via a network connection, or via a Bluetooth connection with a mobile phone. Further, method 500 may monitor for a user initiating a voice call. As an example, a user may initiate a voice call via a mobile device connected to the in-vehicle computing system via a Bluetooth connection, or may use an input device of the in-vehicle computing system (e.g., such as one of a touch screen input and a voice command) to initiate a voice call.

At step 504, method 500 includes determining whether a voice call is detected. For example, if the controller determines that a user initiated a voice call, method 500 may determine that a voice call is detected. Further, if the controller detects an incoming voice call, method 500 may determine that a voice call is detected. If the controller determines that a user is not initiating a voice call and no voice calls are incoming, the controller may determine that a voice call is not detected.

If method 500 determines that a voice call is not detected at 504 ("NO"), method 500 continues to step 506 and includes not adjusting the system audio. For example, if a voice call is not detected, no adjustments to the system audio may be indicated. For example, the controller may not prompt the user to select a phone zone, may not route telephone audio to a selected phone zone, and may not adjust system audio to reduce sonic interference with the voice call.

If method 500 determines that a voice call is detected at 504 ("YES"), method 500 continues to step 508 and includes selecting at least one desired phone zone. For example, method 500 may select the at least one desired phone zone based on a user input. As an example, a user may input the desired phone zone via an input device, such as one of a touch screen, a button, a voice command, and the like. For example, a one or both of a display device and a voice alert may prompt the user to input the desired phone zone, and the controller may monitor for a response from the user. As an example, a user may select one or more phone zone for the voice call. When a user selects multiple phone zones, the selected phone zones may be combined, as elaborated with respect to FIG. 3. Further, in some examples, a default phone zone may be selected as the desired phone zone if the user does not respond to the prompt for input. As another examples, the controller may select the desired phone zone (s) based on a source of the voice call. For example, the controller may determine at least one desired phone zone based on a mobile device receiving the voice call. As an example, the controller may consult a pre-determined look-up table correlating mobile devices to phone zones. As another example, the controller may determine a location of the mobile device receiving the voice call, and may select the phone zone closest to the determined location. For example, the controller may determine the location of the mobile device via a Bluetooth connection, an NFC connection, or another method of location mobile devices. As another example, an incoming voice call may include associated metadata, and the controller may select the desired phone zone based on the associated metadata. As one example, the associated metadata may include an intended recipient of the voice call, and the controller may determine a phone zone associated with the intended recipient of the voice call. Note that more than one phone zone may be selected.

At step 510, method 500 includes routing the voice call to the at least one selected phone zone. For example, routing the voice call to the at least one selected phone zone may include passing incoming call audio to the speakers of the at least one selected phone zone, and capturing outgoing call audio from microphones of the at least one selected phone zone. In example, the call audio (incoming) may be only routed to the selected zone, and not other zones. Further, the method may capture only outgoing call audio from the selected phone zone, and not other zones.

At step 512, method 500 includes applying signal processing to the selected phone zone microphones and speakers. For example, speaker settings in the selected phone zone(s) may be adjusted in order to reduce sonic interference for other users, in order to increase privacy for the user receiving the voice call. Further, audio previously playing in the phone zone may be muted or reduced in order to reduce sonic interference. As another example, microphone settings for the at least one selected phone zone may be adjusted to reduce sonic interference. For example, microphones from the at least one selected phone zone may be activated in order to capture outgoing telephone audio, and microphones from unselected phone zones may be muted to reduce interference. In example, rather than completely muting unselected zone microphones, any input captured from those unselected zones can be subtracted from corresponding audio data from the selected zone microphones to actively cancel unwanted input. In an example, in the selected zone speakers, active noise cancelation may be used based on the audio content played on unselected zone speakers from the vehicle entertainment system, as such audio content is known a priori so that an inverse of said audio can be played at the selected zone speakers to actively cancel output of unselected zone speakers. Known phase delay and amplitude gains among the zone, such as based on pre-mapping of the cabin acoustics, may be used by the system for such active cancellation.

At step 514, method 500 includes determining whether audio is already playing on the audio system. For example, the controller may determine whether main system audio is playing via the vehicle audio system. As an example, the main system audio may be one of music, talk radio, movie audio, and the like.

If method 500 determines that audio is already playing on the audio system at 514 ("YES"), method 500 continues to 516 and includes adjusting the main system audio. For example, if the controller determines that audio is playing on the audio system, the main system gain may be adjusted in order to reduce sonic interference with the voice call. For example, audio playing in other phone zones may interfere with outgoing call audio for the voice call. As such, the main system audio may be ducked (e.g., the volume may be reduced) and compressed in order to reduce interference. The main system audio may be adjusted differently for each speaker in each unselected phone zone, based on proximity to other speakers and microphones of the vehicle, and due to vehicle noise. In some examples, the main system audio may be muted in the selected phone zone (e.g., the phone zone receiving the voice call). Method 500 may continue to step 518.

If method 500 determines that audio is not already playing on the audio system at 514 ("NO"), method 500 continues to step 518 and includes determining whether an additional phone zone has been added. For example, during a voice call a user may decide to add an additional phone zone to the call during the voice call, and may input a command via an input device, such as a touch screen.

If method 500 determines that an additional phone zone has been added at 518 ("YES"), method 500 continues to 520 and includes routing the voice call to the additional phone zone. For example, the signal processing described at step 512 may be applied to speakers and microphones of the additional phone zone. Method 500 may then continue to step 522.

If instead method 500 determines that an additional phone zone was not added at step 518 ("NO"), method 500 continues to step 522 and includes determining whether the voice call is still in progress. For example, the controller may check to determine whether the voice call is continuing.

If method 500 determines that the voice call is still in progress at step 522 ("YES"), method 500 continues to step 526 and includes maintaining the audio system settings for the voice call. For example, the controller may continue to duck and compress the main system audio, and may continue to route the voice call to the at least one selected phone zone. Method 500 may then return to step 518.

If method 500 determines that the voice call is no longer in progress at step 522, method 500 continues to step 524 and includes returning to nominative audio system settings. For example, incoming call audio may not be broadcast to the user, and outgoing call audio may not be captured by microphones of the selected phone zone(s). As an example, the voice call may have been terminated by the user. Thus, method 500 may resume playing main system audio for the selected phone zone, and may stop ducking and compressing the main system audio. Method 500 may then end.

In this way, voice calls may be routed to one or more selected phone zones of a vehicle system so that a user may receive a phone call without interrupting media in other phone zones. For example, when an incoming call is detected or an outgoing call is initiated, an in-vehicle computing system of the vehicle system may select at least one phone zone of a plurality of phone zones of the vehicle. Incoming audio from the voice call may be routed to speakers of the at least one selected phone zone, and outgoing audio for the voice call may be captured by microphones of the at least one selected phone zone. Thus, the vehicle system may provide hands-free voice calls to the user. Further, main system audio may continue to play for the unselected phone zones (e.g., the phone zones not selected for the voice call). However, the main system audio may be ducked and compressed in order to reduce sonic interference with the voice call. Further, beamforming and echo cancelling may be used in order to reduce additional sonic interference with the outgoing call audio. Thus, a subset of passengers in a vehicle may engage with a voice call privately, while other passengers may continue to listen to other media, such as music. Further, by applying signal processing techniques, and by differentially adjusting each microphone and speaker to reduce sonic interference, voice call audio quality may be increased. Overall, customer satisfaction with an in-vehicle infotainment system may be increased.

A technical effect of the disclosure is that incoming audio from a voice call may be provided to a selected phone zone, outgoing audio from the voice call may be captured from a selected phone zone, and a main system audio may be ducked and compressed in order to reduce sonic interference with the voice call.

As an example, a method comprises: responsive to a voice call, routing the voice call to at least one phone zone of a plurality of phone zones based on at least one of a user input and a source of the voice call, the plurality of phone zones included in a cabin of a motor vehicle. In the preceding example, additionally or optionally, routing the voice call to the at least one phone zone of the plurality of phone zones based on the at least one of the user input and the source of the voice call includes: selecting the at least one phone zone of the plurality of phone zones based on the at least one of the user input and the source of the voice call; providing incoming audio from the voice call to the at least one phone zone via speakers of the at least one phone zone; capturing outgoing audio for the voice call from the at least one phone zone via microphones of the at least one phone zone; and applying signal processing to each of the incoming audio and the outgoing audio based on a position of the at least one phone zone. In one or both of the preceding examples, additionally or optionally, selecting the at least one phone zone of the plurality of phone zones based on the at least one of the user input and the source of the voice call includes: responsive to the source of the voice call being a first mobile device, selecting the at least one phone zone based on an identifier of the first mobile device; responsive to the source of the voice call being a second mobile device, selecting the at least one phone zone based on an identifier of the second mobile device; responsive to the source of the voice call being an application of a computing system of the motor vehicle, and the voice call including associated metadata, selecting the at least one phone zone based on the associated metadata; responsive to the user input corresponding to a first phone zone of the plurality of phone zones, selecting the first phone zone; and responsive to the user input corresponding to the first phone zone and a second phone zone of the plurality of phone zones, selecting both of the first phone zone and the second phone zone. In any or all of the preceding examples, additionally or optionally, each phone zone of the plurality of phone zones includes at least one microphone and at least one speaker. In any or all of the preceding examples, additionally or optionally, providing the incoming audio from the voice call to the at least one phone zone via the speakers of the at least one phone zone includes: routing the incoming audio to a phone zone mixer; and broadcasting the incoming audio via the speakers of the at least one phone zone. In any or all of the preceding examples, additionally or optionally, capturing the outgoing audio for the voice call from the at least one phone zone via the microphones of the at least one phone zone includes: routing the outgoing audio to a speech processor; and transmitting the outgoing audio via a wireless network. In any or all of the preceding examples, additionally or optionally, applying signal processing to each of the incoming audio and the outgoing audio based on the position of the at least one phone zone includes: applying echo cancelling and beam forming to the outgoing audio. In any or all of the preceding examples, the method additionally or optionally further comprises: adjusting each of an audio gain for a main system audio source differently for phone zone of the plurality of phone zones based on the position of the at least one phone zone in the cabin of the motor vehicle.

As another example, a method comprises: responsive to a first voice call, selecting each of a first group of phone zones and a second group of phone zones, each phone zone of the first group of phone zones and each phone zone of the second group of phone zones in a cabin of a motor vehicle; routing the first voice call to the first group of phone zones, and not routing the first voice call to the second group of phone zones of the motor vehicle, each phone zone of each of the first group of phone zones and the second group of phone zones including at least one speaker and at least one microphone; and adjusting a main system audio differently for each of the first group of phone zones and the second group of phone zones. In the preceding example, additionally or optionally, routing the first voice call to the first group of phone zones includes: broadcasting incoming voice call audio via speakers of the first group of phone zones; capturing outgoing voice call audio via microphones of the first group of phone zones; applying echo cancelling and beam forming to the outgoing voice call audio. In one or both of the preceding examples, additionally or optionally, not routing the first voice call to the second group of phone zones includes: not broadcasting the incoming voice call audio via speakers of the second group of phone zones; and not capturing audio via microphones of the second group of phone zones. In any or all of the preceding examples, additionally or optionally, adjusting the main system audio differently for each of the first group of phone zones and the second group of phone zones includes: compressing the main system audio; muting the main system audio for the first group of phone zones; and reducing a main system audio gain for the second group of phone zones. In any or all of the preceding examples, additionally or optionally, selecting each of a first group of phone zones and a second group of phone zones is based on at least one of a user input and a source of the first voice call. In any or all of the preceding examples, the method additionally or optionally further comprises: responsive to a second voice call, selecting a third group of phone zones, each phone zone of the third group of phone zones in the cabin of the motor vehicle; routing the second voice call to the third group of phone zones, and not routing the second voice call to each of the first group of phone zones and the second group of phone zones, the third group of phone zones including at least one microphone and at least one speaker; and adjusting the main system audio differently for each of the first group of phone zones, the second group of phone zones, and the third group of phone zones. In any or all of the preceding examples, additionally or optionally, adjusting the main system audio differently for each of the first group of phone zones and the second group of phone zones further includes: adjusting a main system audio gain for each of the first group of phone zones and the second group of phone zones based on at least one of a position of the phone zone and a vehicle speed.

As yet another example, a computing system comprises: a first phone zone located in a cabin of a motor vehicle, the first phone zone including a first microphone and a first speaker; a second phone zone located in the cabin of the motor vehicle, the second phone zone including a second microphone and a second speaker; a user input device; a processor communicatively coupled to the computing system; and a storage device storing instructions executable by the processor to: responsive to a voice call, select one of the first phone zone and the second phone zone based on at least one of a user input from the user input device and a source of the voice call; responsive to selecting the first phone zone, route incoming voice call audio to the first speaker, capture outgoing call audio from the first microphone, and not capture the outgoing call audio from the second microphone; and responsive to selecting the second phone zone, route the incoming voice call audio to the second speaker, capture the outgoing call audio from the second microphone, and not capture the outgoing call audio from the first microphone. In the preceding example, additionally or optionally, the storage device stores further instructions executable by the processor to: responsive to detecting a main system audio source, decrease an audio gain for the main system audio source and compress the main system audio source; adjust the first speaker based on a position of the first speaker relative to the second speaker; and adjust the second speaker based on the position of the first speaker relative to the second speaker. In one or both of the preceding examples, additionally or optionally, to capture the outgoing call audio from the first microphone, the storage device stores further instructions executable by the processor to: apply beam forming and echo cancelling to the outgoing call audio from the first microphone. In any or all of the preceding examples, additionally or optionally, to capture the outgoing call audio from the second microphone, the storage device stores further instructions executable by the processor to: apply beam forming and echo cancelling to the outgoing call audio from the second microphone. In any or all of the preceding examples, additionally or optionally, the source of the voice call is a mobile phone is communicatively coupled to the computing system.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the telematics unit 30 described with reference to FIG. 1. The methods may be performed by executing stored instructions with one or more logic devices (e.g., processors) in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
  responsive to a voice call, routing the voice call to at least one phone zone of a plurality of phone zones based on at least one of a user input and a source of the voice call, the plurality of phone zones included in a cabin of a motor vehicle; and
  adjusting each of an audio gain for a main system audio source differently for phone zone of the plurality of phone zones based on the position of the at least one phone zone in the cabin of the motor vehicle, wherein the adjusting includes ducking and compressing the main system audio while continuing to route the voice call to the at least one phone zone.

2. The method of claim 1, wherein routing the voice call to the at least one phone zone of the plurality of phone zones based on the at least one of the user input and the source of the voice call includes:
  selecting the at least one phone zone of the plurality of phone zones based on the at least one of the user input and the source of the voice call;
  providing incoming audio from the voice call to the at least one phone zone via speakers of the at least one phone zone;
  capturing outgoing audio for the voice call from the at least one phone zone via microphones of the at least one phone zone; and
  applying signal processing to each of the incoming audio and the outgoing audio based on a position of the at least one phone zone.

3. The method of claim 2, wherein selecting the at least one phone zone of the plurality of phone zones based on the at least one of the user input and the source of the voice call includes:
  responsive to the source of the voice call being a first mobile device, selecting the at least one phone zone based on an identifier of the first mobile device;
  responsive to the source of the voice call being a second mobile device, selecting the at least one phone zone based on an identifier of the second mobile device;
  responsive to the source of the voice call being an application of a computing system of the motor vehicle, and the voice call including associated metadata, selecting the at least one phone zone based on the associated metadata;

responsive to the user input corresponding to a first phone zone of the plurality of phone zones, selecting the first phone zone; and responsive to the user input corresponding to the first phone zone and a second phone zone of the plurality of phone zones, selecting both of the first phone zone and the second phone zone.

4. The method of claim 2, wherein each phone zone of the plurality of phone zones includes at least one microphone and at least one speaker.

5. The method of claim 2, wherein providing the incoming audio from the voice call to the at least one phone zone via the speakers of the at least one phone zone includes:

routing the incoming audio to a phone zone mixer; and broadcasting the incoming audio via the speakers of the at least one phone zone.

6. The method of claim 2, wherein capturing the outgoing audio for the voice call from the at least one phone zone via the microphones of the at least one phone zone includes:

routing the outgoing audio to a speech processor; and transmitting the outgoing audio via a wireless network.

7. The method of claim 2, wherein applying signal processing to each of the incoming audio and the outgoing audio based on the position of the at least one phone zone includes:

applying echo cancelling and beam forming to the outgoing audio.

8. A method, comprising:

responsive to a first voice call, selecting each of a first group of phone zones and a second group of phone zones, each phone zone of the first group of phone zones and each phone zone of the second group of phone zones in a cabin of a motor vehicle;

routing the first voice call to the first group of phone zones, and not routing the first voice call to the second group of phone zones of the motor vehicle, each phone zone of each of the first group of phone zones and the second group of phone zones including at least one speaker and at least one microphone; and adjusting a main system audio differently for each of the first group of phone zones and the second group of phone zones, wherein adjusting the main system audio differently for each of the first group of phone zones and the second group of phone zones includes:

compressing the main system audio;

muting the main system audio for the first group of phone zones; and reducing a main system audio gain for the second group of phone zones.

9. The method of claim 8, wherein routing the first voice call to the first group of phone zones includes:

broadcasting incoming voice call audio via speakers of the first group of phone zones;

capturing outgoing voice call audio via microphones of the first group of phone zones;

applying echo cancelling and beam forming to the outgoing voice call audio.

10. The method of claim 8, wherein not routing the first voice call to the second group of phone zones includes:

not broadcasting the incoming voice call audio via speakers of the second group of phone zones; and not capturing audio via microphones of the second group of phone zones.

11. The method of claim 8, wherein selecting each of a first group of phone zones and a second group of phone zones is based on at least one of a user input and a source of the first voice call.

12. The method of claim 8, further comprising:

responsive to a second voice call, selecting a third group of phone zones, each phone zone of the third group of phone zones in the cabin of the motor vehicle;

routing the second voice call to the third group of phone zones, and not routing the second voice call to each of the first group of phone zones and the second group of phone zones, the third group of phone zones including at least one microphone and at least one speaker; and adjusting the main system audio differently for each of the first group of phone zones, the second group of phone zones, and the third group of phone zones.

13. A method, comprising:

responsive to a first voice call, selecting each of a first group of phone zones and a second group of phone zones, each phone zone of the first group of phone zones and each phone zone of the second group of phone zones in a cabin of a motor vehicle;

routing the first voice call to the first group of phone zones, and not routing the first voice call to the second group of phone zones of the motor vehicle, each phone zone of each of the first group of phone zones and the second group of phone zones including at least one speaker and at least one microphone; and adjusting a main system audio differently for each of the first group of phone zones and the second group of phone zones, wherein adjusting the main system audio differently for each of the first group of phone zones and the second group of phone zones further includes:

adjusting a main system audio gain for each of the first group of phone zones and the second group of phone zones based on at least one of a position of the phone zone and a vehicle speed.

14. A computing system, comprising:

a first phone zone located in a cabin of a motor vehicle, the first phone zone including a first microphone and a first speaker;

a second phone zone located in the cabin of the motor vehicle, the second phone zone including a second microphone and a second speaker;

a user input device;

a processor communicatively coupled to the computing system; and a storage device storing instructions executable by the processor to:

responsive to a voice call, select one of the first phone zone and the second phone zone based on at least one of a user input from the user input device and a source of the voice call;

responsive to selecting the first phone zone, route incoming voice call audio to the first speaker, capture outgoing call audio from the first microphone, and not capture the outgoing call audio from the second microphone; and responsive to selecting the second phone zone, route the incoming voice call audio to the second speaker, capture the outgoing call audio from the second microphone, and not capture the outgoing call audio from the first microphone;

responsive to detecting a main system audio source, decrease an audio gain for the main system audio source and compress the main system audio source;

adjust the first speaker based on a position of the first speaker relative to the second speaker; and adjust the second speaker based on the position of the first speaker relative to the second speaker.

15. The computing system of claim 14, wherein to capture the outgoing call audio from the first microphone, the storage device stores further instructions executable by the processor to:

apply beam forming and echo cancelling to the outgoing call audio from the first microphone.

16. The computing system of claim 14, wherein to capture the outgoing call audio from the second microphone, the storage device stores further instructions executable by the processor to:

apply beam forming and echo cancelling to the outgoing call audio from the second microphone.

17. The computing system of claim 14, wherein the source of the voice call is a mobile phone is communicatively coupled to the computing system.

\* \* \* \* \*